(12) United States Patent
Shen et al.

(10) Patent No.: US 8,700,699 B2
(45) Date of Patent: Apr. 15, 2014

(54) USING A PROXY SERVER FOR A MOBILE BROWSER

(75) Inventors: Huifeng Shen, Beijing (CN); Haicheng Sun, Beijing (CN); Zhaotai Pan, Anhui (CN); Yan Lu, Beijing (CN); Shipeng Li, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 13/087,923

(22) Filed: Apr. 15, 2011

(65) Prior Publication Data
US 2012/0265802 A1  Oct. 18, 2012

(51) Int. Cl.
*G06F 15/16* (2006.01)

(52) U.S. Cl.
USPC .......................................................... 709/203

(58) Field of Classification Search
USPC .......................................... 709/203, 217, 224
See application file for complete search history.

(56) References Cited

U.S. PATENT DOCUMENTS

| | | | |
|---|---|---|---|
| 6,651,252 B1 * | 11/2003 | Gordon et al. | 725/54 |
| 7,590,998 B2 | 9/2009 | Hanley | |
| 2003/0195963 A1 | 10/2003 | Song et al. | |
| 2007/0288855 A1 | 12/2007 | Rohrabaugh et al. | |
| 2008/0254778 A1 * | 10/2008 | Kim | 455/414.3 |
| 2009/0083646 A1 | 3/2009 | Lin et al. | |
| 2009/0320073 A1 | 12/2009 | Reisman | |
| 2010/0050089 A1 | 2/2010 | Kim et al. | |
| 2010/0111410 A1 | 5/2010 | Lu et al. | |
| 2010/0134338 A1 | 6/2010 | Belz et al. | |
| 2010/0158400 A1 | 6/2010 | Lu et al. | |
| 2010/0169945 A1 | 7/2010 | Kennedy et al. | |
| 2010/0245681 A1 | 9/2010 | Harris | |
| 2011/0199389 A1 | 8/2011 | Lu et al. | |
| 2011/0219105 A1 | 9/2011 | Kryze et al. | |
| 2012/0054616 A1 | 3/2012 | Mittal | |

FOREIGN PATENT DOCUMENTS

| | | |
|---|---|---|
| EP | 1330098 A1 | 7/2003 |
| WO | 2004/088543 A1 | 10/2004 |

OTHER PUBLICATIONS

U.S. Appl. No. 13/585,185, filed Aug. 14, 2012, Huifeng Shen, Shipeng Li, Yan Lu, Zhaotai Pan, Jianfeng Wang, "Cooperative Web Browsing Using Multiple Devices," 49 pages.

(Continued)

*Primary Examiner* — El Hadji Sall
(74) *Attorney, Agent, or Firm* — Carole A. Boelitz; Micky Minhas; Lee & HAyes, Pllc.

(57) ABSTRACT

Techniques describe providing a web page for a proxy-based browser on a mobile device to enhance user experience. A proxy server receives a layout of the web page, extracts web elements from the web page, and captures images of the web elements of the web page. The web elements are incorporated with a background screen image to form a composite screen format to represent a display of the web page. The background screen image is compressed by splitting an encoded frame into fixed-size slices and splitting a previous screen frame into fixed-size slices. The proxy server provides the web page synchronized with the mobile device based on the composite screen format and the compressed background screen image. Furthermore, the proxy server receives input from a user to provide updates to web elements that are dynamic on the web page to be displayed on the screen of the mobile device.

20 Claims, 9 Drawing Sheets

(56) References Cited

OTHER PUBLICATIONS

Almeroth et al., "A lightweight protocol for interconnecting heterogeneous devices in dynamic environments," Published Jul. 1999, In IEEE Conference on International Multimedia Computing and Systems, vol. 2, retrieved at <<http://ieeexplore.ieee.org/stamp/stamp.jsp?tp=&arnumber=778477>>, pp. 420-425.

Canfora et al., "Migrating Web Application Sessions in Mobile Computing," in Special interest tracks and posters of the 14th international conference on World Wide Web, ser. WWW 05. New York, NY, USA: ACM, 2005, retrieved at <<http://¬doi.acm.org/¬10.1145/¬1062745.1062921>>, pp. 1166-1167.

Goergen et al., "A session model for cross-domain interactive multi-user IPTV," published Jan. 9, 2010, Consumer Communications and Networking Conference (CCNC), 2010, 7th IEEE, retrieved at <<http://ieeexplore.ieee.org/stamp/stamp.jsp?arnumber=05421792>>, pp. 1-6.

Hesselman et al., "An Open Service Infrastructure for Enhancing Interactive TV Experiences," published Jul. 2008, In Workshop on Sharing Content and Experiences with Social Interactive Television, retrieved at <<http://mmi.tudelft.nl/~joostb/files/Hesselman%20et%20al%202008%20EuroITV08.pdf>>, 2 pages.

Hesselman et al., "Sharing Enriched Multimedia Experiences across Heterogeneous Network Infrastructures," Published Jun. 2010, In Communications Magazine, IEEE, vol. 48, Issue 6, retrieved at <<http://ieeexplore.ieee.org/stamp/stamp.jsp?tp=&arnumber=5473865>>, pp. 54-65.

Hua et al., "A Cooperative Framework for Information Browsing in Mobile Environment," retrieved on Mar. 26, 2012 at <<http://www.irma-international.org/viewtitle/26524/>>, 3 pages.

Kim et al., "Streaming Session Mobility across Multiple Devices in Mobile IPTV Environments," Ubiquitous Information Technologies & Applications, 2009. ICUT 09, published Dec. 20, 2009, retrieved from <<http://ieeexplore.ieee.org/stamp/stamp.jsp?arnumber=05405714>>, pp. 1-6.

Potter et al., "Webpod: persistent web browsing sessions with pocketable storage devices," in Proceedings of the 14th international conference on World Wide Web, ser. WWW 05. New York, NY, USA: ACM, 2005, retrieved at <<http://¬doi.acm.org/-10.1145/¬1060745.1060833>>, pp. 603-612.

Russell et al., "The future of integrated design of ubiquitous computing in combined real & virtual worlds," published Apr. 18, 1998, CHI 98 Conference summary on Human factors in computing systems, retrieved at <<http://web.archive.org/web/20051024110148/http://mami.uclm.es/jbravo/docencia/doctorado/Fundamentos-Weiser/UC_combined_real_and_virtual.pdf>>, pp. 275-276.

Schwarz et al., "Overview of the Scalable Video Coding Extension of the H.264/AVC Standard," Circuits and Systems for Video Technology, IEEE Transactions on, 2007. retrieved at <<http://ieeexplore.ieee.org/stamp/stamp.jsp?tp=&arnumber=4317636>>, pp. 1103-1120.

Shen et al., "A High-Performance Remote Computing Platform," in PerCom Workshops, 2009, A High-Performance Remote Computing Platform, retrieved at <<http://ieeexplore.ieee.org/stamp/stamp.jsp?tp=&arnumber=4912855>>, 6 pages.

Skyfire Labs, "Skyfire mobile web browser," retrieved at << http://www.skyfire.com/en/for-consumers/products,>>, 2009, 4 pages.

Song et al., "Browser Session Preservation and Migration," In Poster Session of WWW 2002, Hawai, retrieved at <<http://www2002.org/www2002/CDROM/poster/80.pdf>>, 2 pages.

Wallace et al., "Virtually shared displays and user input devices," published Jun. 20, 2007, ATC 07, 2007 USENIX Annual Technical Conference on Proceedings of the USENIX Annual Technical Conference, retrieved at <<http://www.cs.princeton.edu/~gwallace/papers/virtually-shared-displays.pdf>>, 6 pages.

Baratto et al., "THINC: A Remote Display Architecture for Thin-Client Computing", Department of Computer Science Columbia University Technical Report CUCS-027-04, Jul. 2004, 15 pages.

Bournique, "Bolt Browser Review/Wap Review", <<http://wapreview.com/blog/?p=2598>>, Jan. 17, 2009, 9 pages.

Bournique, "Browser Comparison—TeaShark vs Opera", <<http://wapreview.com/blog/?p=858>>, Aug. 25, 2008, 9 pages.

Bournique, "Official English UCWEB 7.0 Browser Reviewed—Great Feature Set But Many Sites Fail to Load", <<http://wapreview.com/blog/?p=5992>>, Dec. 30, 2009, 9 pages.

"Firefox Home—looking to the future", <<http://blog.mozilla.com/mobile/2010/09/28/firefox-home-looking-to-the-future/>>, Posted by ragavan, Sep. 28, 2010, 11 pages.

Kim, et al., "pTHINC: A Thin-Client Architecture for Mobile Wireless Web", International World Wide Web Conference, May 23-26, 2006, 10 pages.

"Opera Mini and Opera Mobile", retrieved on Nov. 24, 2010 at <<http://www.opera.com/mobile/>>, 1 page.

Products—Skyfire, "Now there's a Smart Browser for Smart phones" retrieved on Nov. 24, 2010 at<<http://www.skyfire.com/product>>, Sky fire Labs, Inc., 1 page.

"Review: Thunderhawk—PDAPhoneHome", <<http://pdaphonehome.com/forums/articles/7538-review-thunderhawk.html>>, Published by outlookchick, Jul. 9, 2003, 3 pages.

"International Search Report & Written Opinion for PCT Patent Application No. PCT/US2013/053538", Mailed Date: Oct. 25, 2013, Filed Date: Aug. 5, 2013, 15 Pages.

Mate, et al., "Movable-Multimedia: Session Mobility in Ubiquitous Computing Ecosystem", In Proceedings of the 5th International Conference on Mobile and Ubiquitous Multimedia, Dec. 4, 2006, 5 Pages.

Komiya, et al., "Use Cases for Session Mobility in Multimedia Applications", Draft-Komiya-Mmusic-Session-Mobility-Usecases-00.txt, Mmusic Working Group, Internet Draft, Feb. 27, 2006, 11 Pages.

Canfora, et al., "Proxy-Based Hand-off of Web Sessions for User Mobility", In Proceedings of the Second Annual International Conference on Mobile and Ubiquitous Systems: Networking and Services, Jul. 17, 2005, 10 Pages.

* cited by examiner

USING A PROXY SERVER FOR A MOBILE BROWSER

BACKGROUND

The increasing popularity of mobile devices and rapid development of wireless networks result in individuals using their mobile devices to access web services daily. Access to the web services is possible by using a web browser for retrieving and presenting text, images, videos, and other multimedia available on world wide web (WWW). Also, the web browser may be used to access information provided by web servers in private networks or in file systems.

Due to the popularity of the mobile devices, a variety of mobile web browsers is available on mobile devices. Two common mobile browsers that are available are a native browser and a thin-client based browser.

Typically, the native browser directly downloads web pages from the web servers. The native browser then parses and renders the web pages on a mobile device. Due to the limited computing resources on the mobile device, the native browser has limited resources to support complicated HyperText Markup Language (HTML) objects, which require client side computation. As a result, web providers may develop and maintain two different versions of web pages with the same content. The web providers create a version for a desktop browser and simplify another version for a mobile browser with limited computing capability. Thus, a problem is that users of the simplified mobile browser have browsing experiences that are less rewarding or rich than the desktop browser. The problem with using the native browser is the limited capabilities.

The thin-client based browser decouples application logic and a display of a browser. The application logic of the browser includes a HTML parser and a renderer, which are executed on a proxy server. The proxy server retrieves, parses, and renders the web pages to bitmaps, and compresses the bitmaps to send to a client. The client decompresses and displays the bitmaps, along with sending user input to the proxy server. Problems with the thin-client based browser include low-bandwidth and latency issues.

SUMMARY

This disclosure describes providing a web page for a proxy-based browser on a mobile device to enhance user experience. A process that may be performed by a proxy server, receives a web page, extracts web elements from the web page, and captures images of the web elements of the web page. The process incorporates web elements that are dynamic with a background screen image to form a composite screen format to represent a display of the web page. The process compresses a background screen image by performing a slice-based screen encoding to split an encoded frame into fixed-size slices and to split a previous screen frame into fixed-size slices. The process provides the web page that is synchronized with the mobile device based on the composite screen format and the compressed background screen image. Furthermore, the process provides progressive screen updates to the web page being displayed.

In another implementation, a process by a proxy server describes receiving user input for a web page being displayed on a proxy-based browser. The proxy server provides a response based on the user input to the web page. The user input is for a web page currently being displayed in a screen of a mobile device. Initially, the proxy server sends web-element information to the proxy-based browser. The proxy-based browser uses the web-element information being received to execute interactive logic to provide the response to the user input. As a result, the proxy server provides updates to dynamic web elements, as requested based on the user input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes an architecture and techniques for providing web pages for a proxy-based browser on a mobile device to enhance user experience. The proxy-based browser provides a solution for the mobile device by displaying reformatted web pages to solve display problems on the mobile devices and by optimizing an element-level interactivity at the same time.

A proxy server reformats the web pages by compressing background screen images of the web pages based on a slice-based encoding scheme. The slice-based encoding scheme splits frames into slices and detects differences between the various slices from the frames. The detected non-skipped blocks in the slices are encoded. The proxy server sends the encoded slices separately to the proxy-based browser. Thus, the proxy server reformats the web pages to provide an optimal fit of the web pages on a small screen display of the mobile device.

The proxy server optimizes the element-level interactivity of the proxy-based browser with a user. The proxy server applies a HyperText Markup Language (HTML)-element interaction that reduces undesired bandwidth consumption for the mobile device. The proxy-based browser receives input from the user, receives a retrieved web page with web elements in HTML, and receives selective updates from the proxy server based on the input received from the user. Initially, the proxy server sends a first screenshot of dynamic web elements in the retrieved web page to the proxy-based browser. If the user clicks on the dynamic web elements, which may include multimedia platform advertisements or displays with high frame-rate animations, the proxy-based browser updates the dynamic web elements. Otherwise, the proxy server does not update the dynamic web elements automatically or continuously.

While aspects of described techniques can be implemented in any number of different computing systems, environments, and/or configurations, implementations are described in the context of the following the example computing environment.

Illustrative Environment

Figure 1:
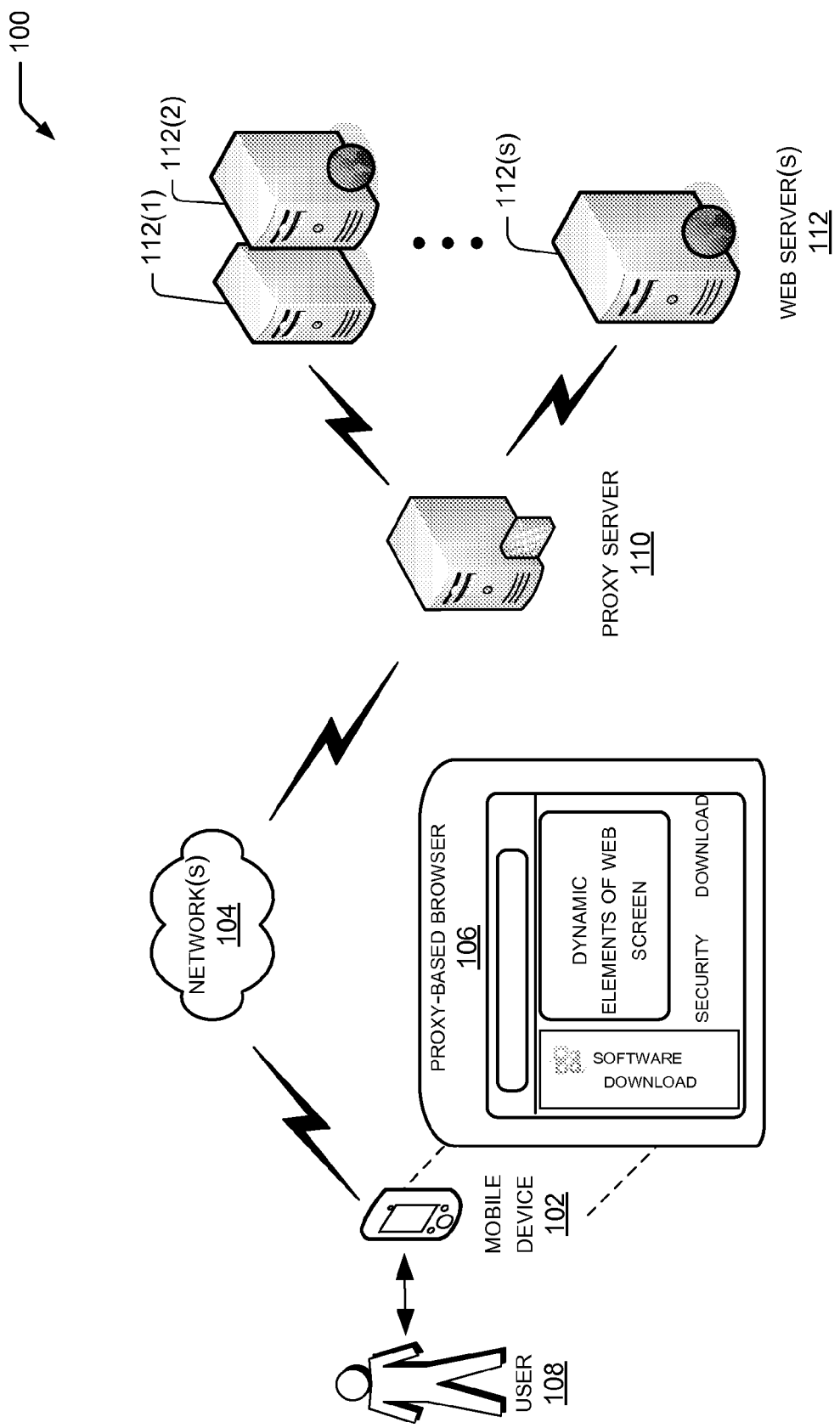
FIG. 1 illustrates an example architecture for implementing a proxy-based browser for a mobile device by using a proxy server.

FIG. 1 illustrates an example architectural environment 100, usable to implement a proxy-based browser for a mobile device. The environment 100 includes an example mobile device 102, which is illustrated as a smart phone. The mobile device 102 is configured to connect via one or more network(s) 104 through the proxy-based browser 106 for a user 108.

The mobile device 102 may take a variety of forms, including, but not limited to, a portable handheld computing device (e.g., a personal digital assistant, a smart phone, a cellular phone), a personal navigation device, a laptop computer, a desktop computer, a portable media player, or any other device capable of connecting to one or more network(s) 104.

The network(s) 104 represents any type of communications network(s), including wireless networks (e.g., cellular, satellite, Wi-Fi, and Bluetooth) and wire-based networks (e.g., public switched telephone, cable, and data networks).

The proxy-based browser 106 represents a browser for the mobile device 102, which receives requests for information resources. Typically, the user 108 types a request for the information resources on the proxy-based browser 106. The information resources include but are not limited to web pages, images, files, videos, audio, other multimedia, and other types of content. After the information resources are retrieved, the proxy-based browser 106 displays the information resources that are optimized for display on a small screen of the mobile device 102. For instance, the user 108 may input a uniform resource identifier (URI) in an address bar of the proxy-based browser 106.

FIG. 1 further includes a proxy server 110, which receives the request from the proxy-based browser 106. The proxy server 110 acts as an intermediary for the requests from the proxy-based browser 106 by sending or transmitting the request to other servers. For instance, the proxy server 110 transmits the request for the information resources to web server(s) 112(1), 112(2), . . . , 112(S). The proxy server 110 then receives the retrieved information resources sent from the web server(s) 112(1), 112(2), . . . , 112(S).

The proxy server 110 is configured to receive requests according to hypertext transfer protocol (HTTP), internet message access protocol (IMAP), file transfer protocol (FTP), or the like. The proxy server 110 is further configured to compute a majority of the logic for the proxy-based browser 106. Also, the proxy server 110 is configured to optimize and compress the information resources received from the web server(s) 112 to speed up the load time to the proxy-based browser 106.

The web server(s) 112(1), 112(2), . . . , 112(S) are configured to retrieve the information resources from various websites, servers in private networks, or files in file systems. The web servers 112(1)-(S) may be configured as plural independent servers, or as a collection of servers that are configured to perform larger scale functions accessible by the network(s) 104.

The proxy server 110 and the web servers 112 may be connected in a wireless or wired network, such as a local area network, a metropolitan area network, a wide area network, and the like.

Figure 2:
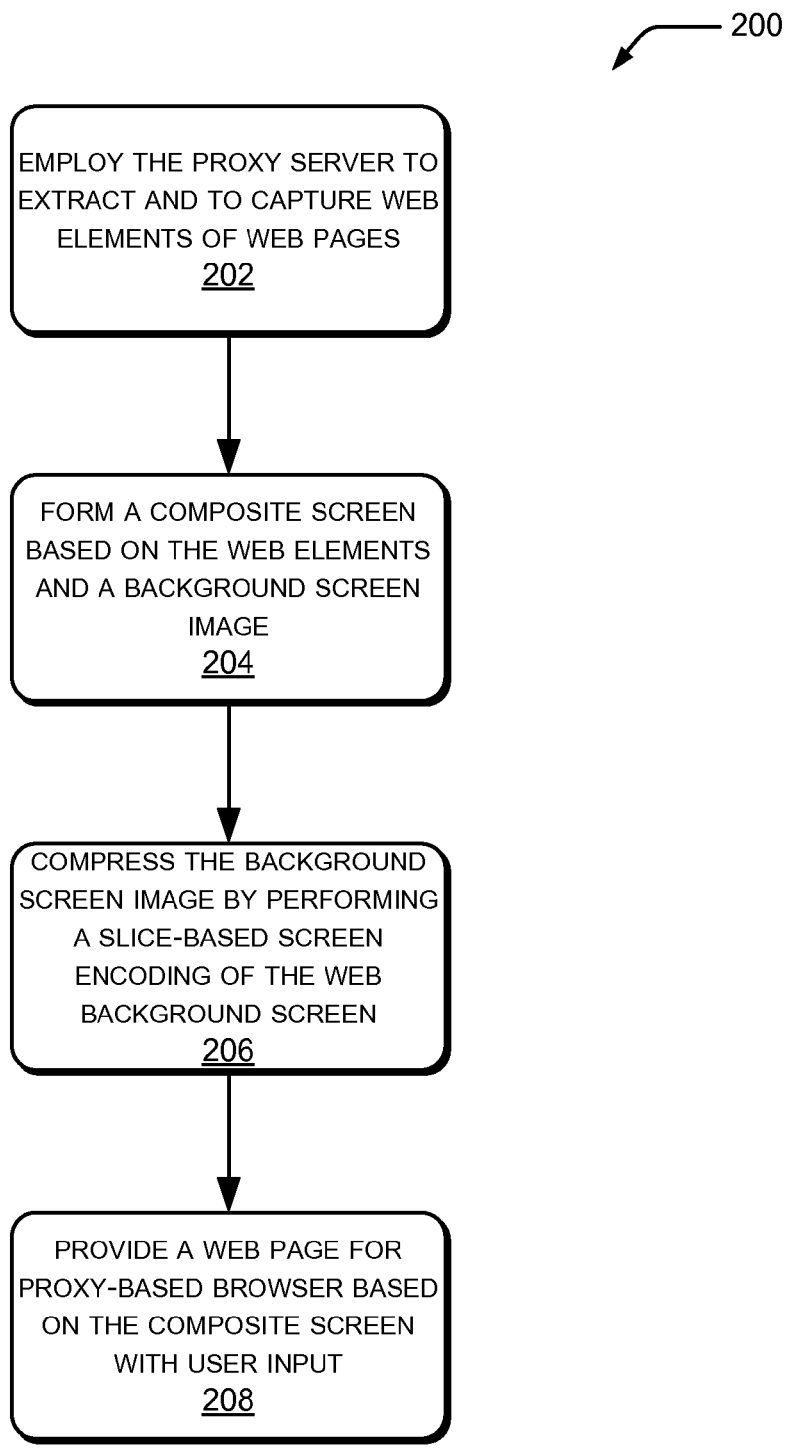
FIG. 2 illustrates an example of high-level functions performed by the proxy server in the architecture of FIG. 1.
Figure 3:
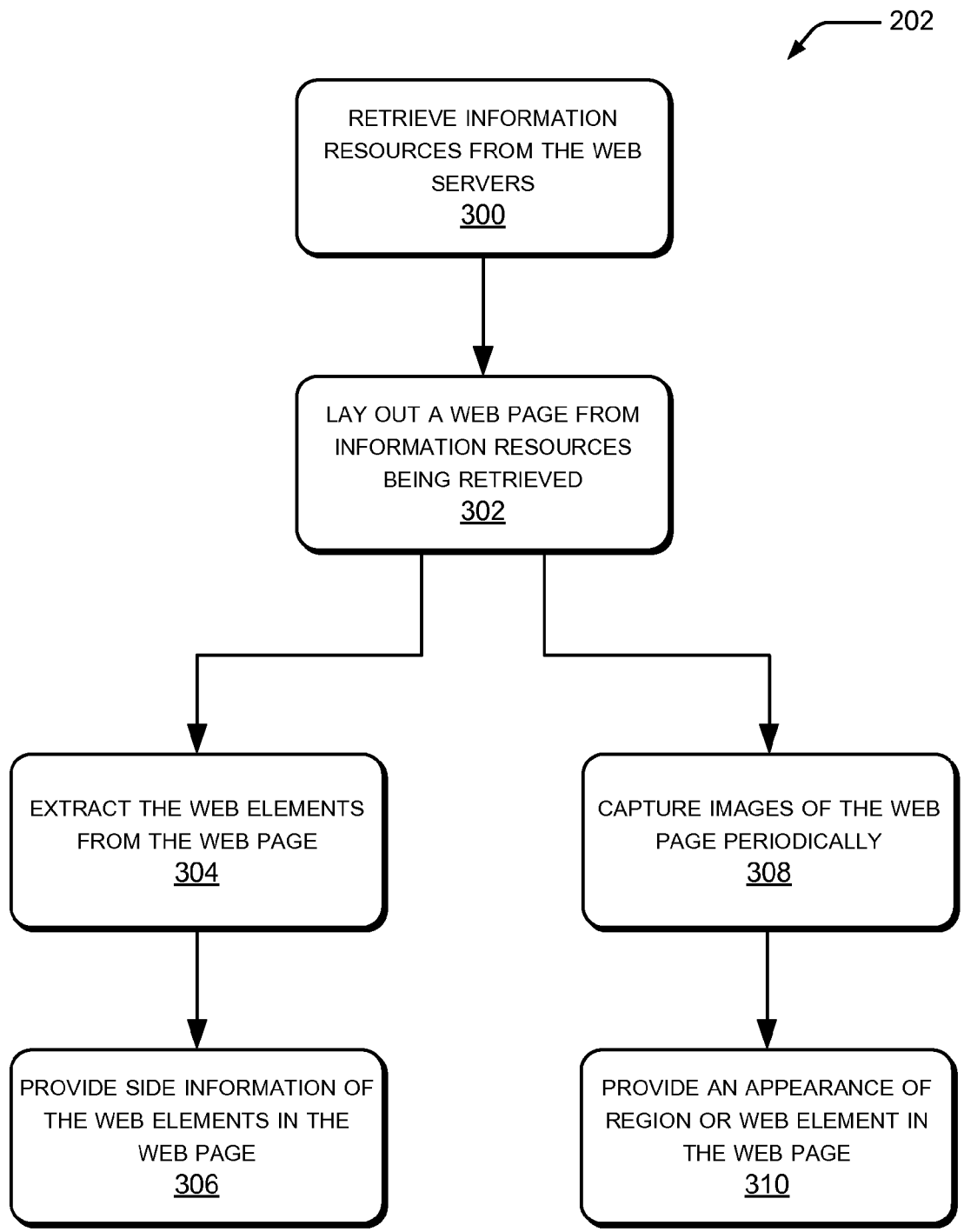
FIG. 3 illustrates an example flow diagram of a process for extracting web elements and capturing a web page by the proxy server.
Figure 7:
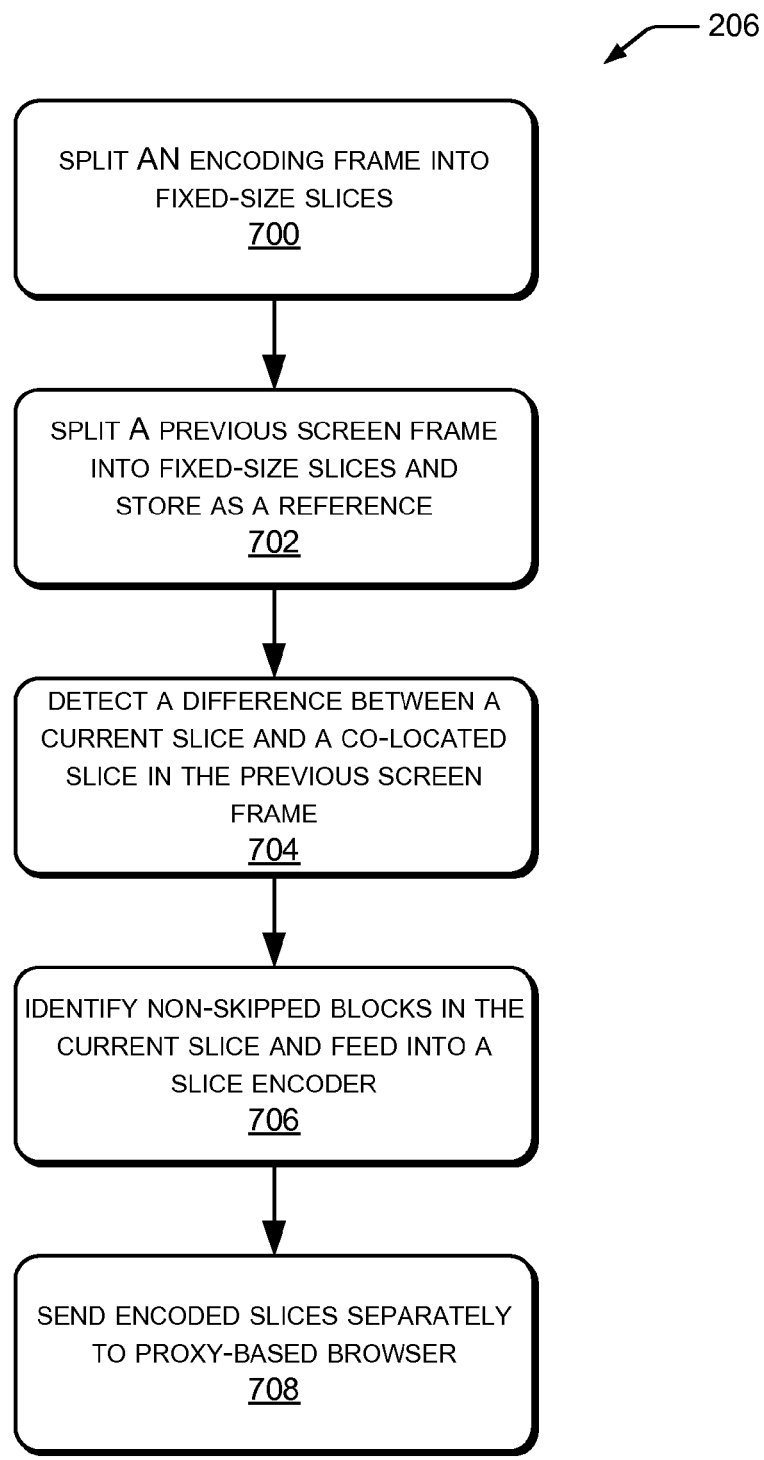
FIG. 7 illustrates an example flow diagram of a process for performing a slice-based encoding scheme.

FIGS. 2, 3, and 7 are flow diagrams showing example processes. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks may be be combined in any order to implement the method, or an alternate method. Moreover, it is also possible for one or more of the provided steps to be omitted.

FIG. 2 is a flow diagram showing an example process 200 showing high-level functions performed by the proxy server 110. The process 200 may be divided into four phases. All of the phases may be used in the environment of FIG. 1, may be performed separately or in combination, and without any particular order.

The first phase is to employ the proxy server 110 to extract and to capture web elements of web pages 202. The proxy server 110 is configured to employ a virtual browser to perform these processes. The extraction process identifies various types of web elements, position and size of the web elements in a current visible region of a web page, and visibility of the web elements. The capture process provides an appearance of the current visible region and the web-elements of the web page to be displayed on the small screen of the mobile device 102.

The second phase is to form a composite screen based on the web elements and a background screen image 204. The proxy server 110 takes the web elements and applies encoding mechanisms to the various web element types. This provides the web-element side information of the web elements to the proxy-based browser 106.

The third phase is to compress the background screen image by performing a slice-based screen encoding of the web background screen 206. The encoding process supports successive frames having variable sizes. The encoding process splits an encoding frame into slices, which helps to solve a memory constraint problem of the mobile device 102. A slice of a frame tends to be a small size, so allocating each slice individually to the mobile device 102 is a minimum amount, rather than allocating a large continuous frame.

The fourth phase is to provide a web page for a proxy-based browser based on the composite screen along with receiving user input 208. The proxy server 110 sends element properties to the proxy-based browser 106. Then the proxy server 110 receives input from the user 108 and selectively updates "interactive" web elements to the proxy-based browser 106 based on options selected by the user 108. This selective update helps reduce undesired bandwidth consumption and benefits the mobile device 102 in a high-latency mobile network environment.

Details of the phases are discussed with reference to FIGS. 3-8 below.

To Extract and to Capture Web Elements of Web Pages

FIG. 3 illustrates the first phase 202 (discussed at high level above) of employing the proxy server 110 to extract and to capture the web elements of web pages.

As previously discussed, the user 108 enters the request for the information resources in the proxy-based browser 106 on the mobile device 102. The proxy-based browser 106 transmits the request over the network 104 to the proxy server 110. The proxy server 110 receives the request and passes the request to the web server(s) 112. Starting in FIG. 3, the request is received at the proxy server 110.

FIG. 3 illustrates the processes performed by a virtual browser of the proxy server 110. In response to the request from the proxy-based browser 106, the virtual browser receives the information resources from the web servers 300. The information resources may include web pages, images, files, videos, audio, other multimedia, and other types of content. In some instances, the information resources may be described according to hypertext markup language (HTML), hypertext markup language for mobile phones (XHTML MP), wireless markup language (WML), cascading style sheets (CSS), ECMAScript, and the like.

The virtual browser lays out a web page from information resources being retrieved 302. HTML, XHTML MP, or CSS defines the appearance and layout of text and other material in the web pages retrieved by the web server(s) 112. The layout identifies structural semantics for text such as headings, paragraphs, lists, links, quotes, and other items. For example, web elements form the building blocks by embedding images and objects in the web page and creating interactive forms.

The virtual browser extracts the web elements from the web page 304. The extraction process identifies a type of the web elements, a region, and a visibility of the web elements. The type of web elements may include but are not limited to a hyperlink, a text input, a password input, a multimedia platform, or a graphics interchange format (GIF). Examples of multimedia platform may include Adobe® Flash®, Microsoft® Silverlight™, Java applets, HTML 5, and the like.

A rapid extraction process is proposed. This extraction process relies on determining whether the web elements are visible within a region. In this process, the virtual browser extracts the web elements that only appear in a current visible region. This helps reduce an amount of the web elements to be extracted and accelerates the extraction process. However, this process may be difficult to determine whether a web element appears in a current visible region, unless the web element is extracted. A possible solution is to estimate a position of the web element based on a position of a parent element. This is based on an assumption that if the region of the parent element is not within range of the visible region, then the child-elements are also not within the range of the visible region.

Next, the virtual browser provides side information of the web elements in the web page 306. For instance, the virtual browser identifies the position and the size of the web elements in the web page.

Returning to 302, the process advances along the right side where the virtual browser captures images of the web page periodically 308. The capturing process occurs periodically, as content on the web page tends to vary over time. Two techniques may be used to capture the images of the web page. One technique is a fixed-size capture, which captures an image of a certain region of a web page, such as a visible region on the mobile device 102. The other technique is a various-size capture, which captures an image of a web element. An example process of capturing the images using the two techniques is shown and discussed with reference to FIG. 4.

Based on the captured image, the virtual browser provides an appearance of a region or web-element in the web page 310. This appearance identifies how the visible regions and the web elements are to be displayed on the screen of the proxy-based browser 106. Thus, the virtual browser produces a rendered whole screen of the web page, visible regions, and the individual displays of the web elements.

Figure 4:
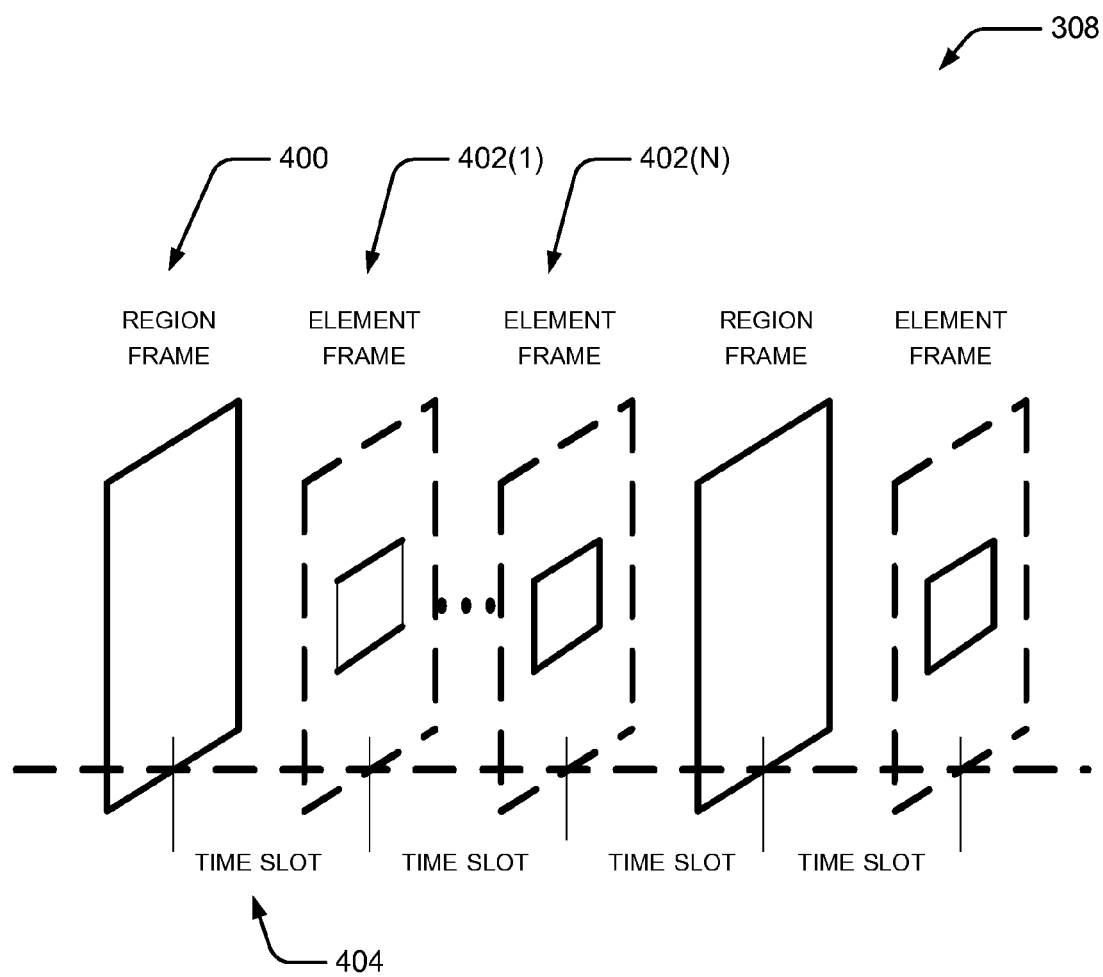
FIG. 4 illustrates an example process for capturing a web page by the proxy server.

FIG. 4 illustrates an example process of capturing the image of the web page periodically 308. The virtual browser uses two techniques as discussed to capture the image of the web page. A frame includes many still images, which compose an animation, a video, a complete moving picture, or the like. The fixed-size technique captures an image of a region of a web page, such as the visible region on the mobile device 102. Shown is a captured region image, which is referred to as a region frame 400. The various-size technique captures an image of a web element. Shown is a captured web element image, which is referred to as element frame(s) 402(1) . . . 402(N).

Thus, the virtual browser captures the frame from animation, video, multimedia platform applications, and the like. The frame is a complete image that may be captured during a known time interval, shown as a time slot 404. The virtual browser reserves a number of time slots 404 in each frame. For instance, shown are different time slots in the region frame 400, the element frame 402(1), and the element frame 402(N). Thus, the virtual browser reserves a different number of time slots for each frame.

The virtual browser may capture the element frame 402(1) much faster than capturing the region frame 400. The virtual browser may perform these techniques separately. For example, the virtual browser may be used to capture the region frame 400 from a static web background first, and then used to capture the element frame(s) 402(1) . . . 402(N) successively for web elements. This helps speed up the web capture process.

Forming a Composite Screen

Figure 5:
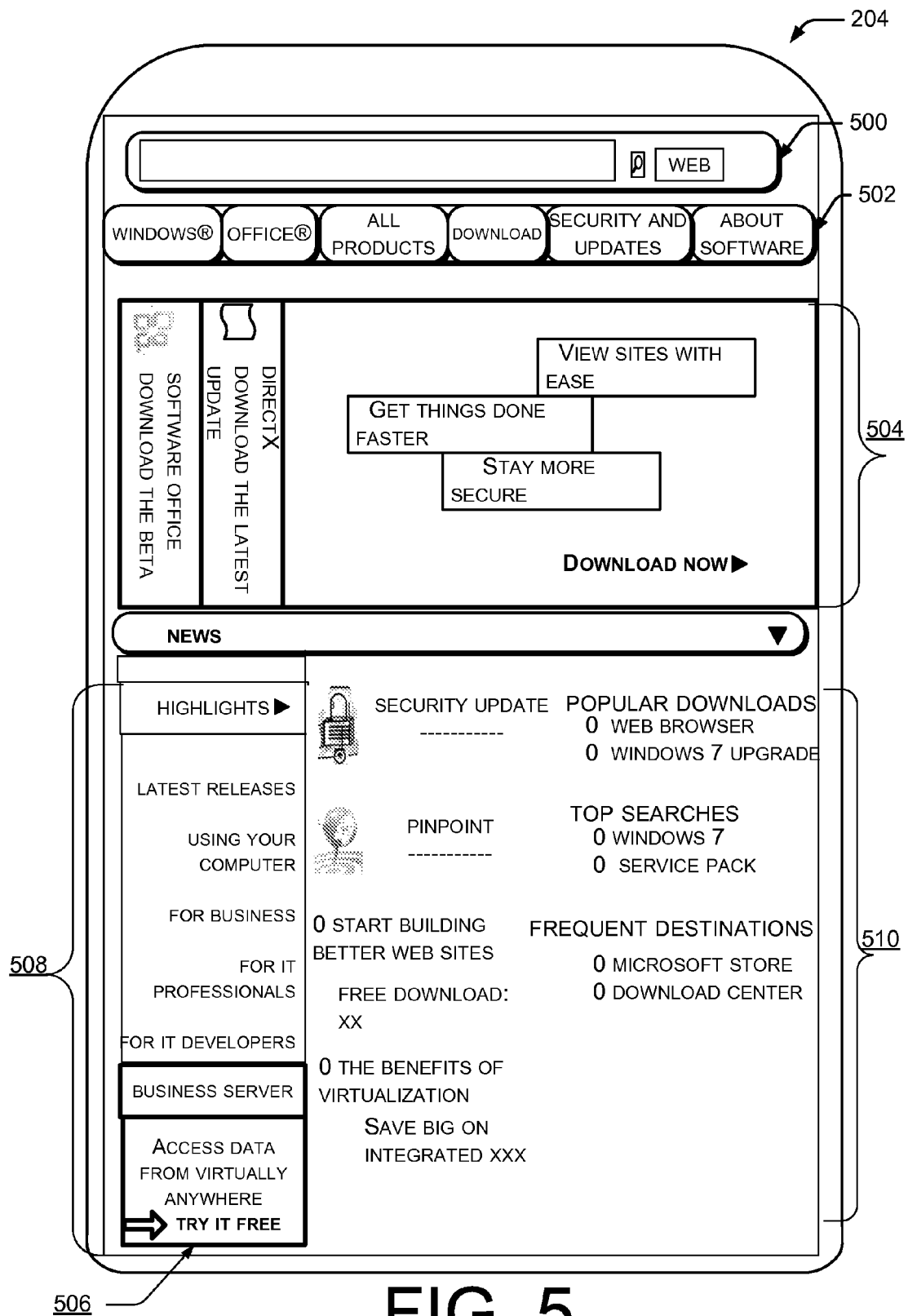
FIG. 5 illustrates an example composite screen format with a background screen image and dynamic web elements.

FIG. 5 illustrates an example diagram for the phase 204 (discussed at a high level above) of forming a composite screen of the web elements with a background screen image. The proxy server 110 uses a combination of a frame-level encoding and an element-level encoding to create the composite screen format for the proxy-based browser 106.

FIG. 5 illustrates the appearance and the layout of text and other material in the web page. An area, such as an address bar is where the user 108 may enter the request on the web page is shown at 500.

The web elements form the building blocks of the web page by embedding images and objects and creating interactive forms. Structural semantics may be used for text, such as headings and links. For example, shown along a row are several links to retrieve products for "Windows®," "Office®," "All Products," or to retrieve information such as "Download," "Security and Updates," and "About Software" 502.

The appearance information and layout identifies how the web elements are displayed on the proxy-based browser 106 optimized for the screen of the mobile device 102. For instance, the virtual browser identifies the position and the size of the web elements in the web page. Shown are dynamic web elements that are visible representing application framework or multimedia platform 504 and graphics interchange format (GIF) 506. The multimedia platform 504 may be used to add animation, video, and interactivity to the web page. For instance, the multimedia platform 504 may include but are not limited to Microsoft® Silverlight™, Adobe® Flash®, Adobe® Shockwave®, or videos. The GIF 506 is a bitmap image format supporting over 200 distinct colors and animations. The dynamic web elements tend to change at any given moment or may be customized frequently, based on certain criteria such as user input. For example, the multimedia platform 504 may be based on displaying the information initially but sending web element updates when the user provides input, rather than automatically (i.e., the web pages do not have to be loaded or reloaded based on the updates). Thus, the virtual browser produces a rendered whole screen of the web page and the individual displays of the dynamic web elements.

The layout of the web page further shows the structural semantics for text, such as headings, paragraphs, lists, links, quotes, and other items. For example, shown along the left side of the web page is a header of "Highlights" 508 with a list below it. In this list of "Highlights" is the dynamic web element GIF 506, "Business Server Access Data From Virtually Anywhere Try It Free."

The layout of the web page further shows the visible regions of the web page. Shown along the right side of the web page are software applications and professional services 510 that are available to the user 108. For instance, shown on the web page are headers of "Security Update," "Popular Downloads," "Pinpoint," "Top Searches,", "Start Building Better Web Sites,", "Frequent Destinations,", and "The Benefits of Virtualization" 510.

The composite screen illustrates a rendered web screen with the dynamic web elements, such as a multimedia platform 504 and GIF 506. The background screen image will be shown in FIG. 6.

Figure 6:
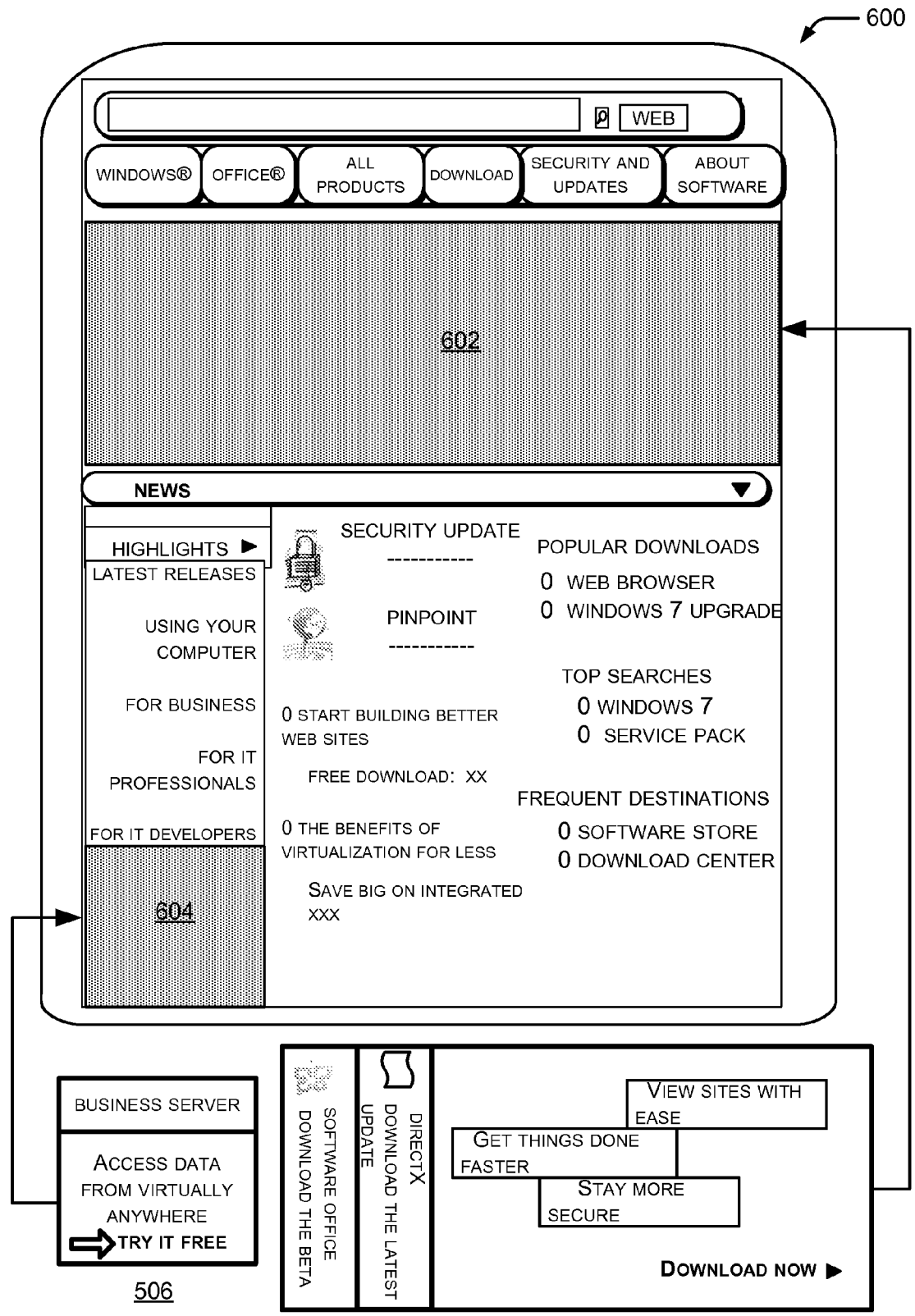
FIG. 6 illustrates the example composite screen format with the dynamic web elements separated from the background screen image.

FIG. 6 illustrates an example diagram 600 of the dynamic web elements, such as multimedia platform 504 and GIF 506 separated from the background screen image. The proxy server 110 separates the dynamic elements (e.g., the multimedia platform 504, GIF 506, video elements, and the like) from the background screen image. The separation process occurs by compressing a static background web screen free of the dynamic web elements 504, 506. For instance, the proxy server 110 separates the multimedia platform 504 from a background screen image 602 and separates the GIF 506 from another background screen image 604.

The proxy server 110 adaptively identifies text blocks and image blocks from the compound screen images and applies different encoding algorithms to the text blocks and the image blocks. The proxy server 110 uses the encoding mechanisms according to the element types. For multimedia platform 504, the proxy server 110 uses a video codec with motion compensation to encode the captured successive frames from these dynamic elements. For GIF 506, the proxy server 110 forwards the GIF images to the proxy-based browser 106 of the mobile device 102.

Perform Slice-Based Screen Encoding

FIG. 7 illustrates an example process for phase 206 (discussed at a high level above) of compressing the background screen image by performing a slice-based screen encoding. For web browsing, the proxy server 110 progressively downloads and renders the web page, which includes the virtual browser capturing frames having various sizes. As a result, the proxy server 110 uses a scheme of encoding and decoding of the background screen image to correlate encoding between the successive variable-size frames, while solving a memory constraint problem.

The proxy server 110 splits an encoding current frame into fixed-size slices 700. Furthermore, the proxy server 110 splits a previous screen frame into fixed-size slices, which are stored as a reference 702. The fixed-size slices from the previous screen frame serve as a reference in a slice buffer to the current slice.

The proxy server 110 performs detecting differences on the block level between a current slice and a co-located slice in the previous screen frame 704, and identifying the non-skip blocks which have different pixels with the co-located blocks in the previous screen frame 704.

The proxy server 110 identifies non-skipped blocks in the current slice, where the non-skipped blocks are fed into a slice encoder. Thus, the proxy server 110 encodes the slice.

The proxy server 110 sends the encoded slices separately to the proxy-based browser through the network 708. The proxy server 110 updates raw slices in the current frame to the slice buffer. The raw slices in the slice buffer serve as a reference for the next screen frame.

The slice-based screen encoding supports utilizing correlations between the frames having various sizes. The frames with the various sizes contain different numbers of slices for slice encoding. If the encoding slice has a co-located reference slice in a previous frame, the proxy server 110 detects a difference check at the block level between the current slice and the reference slice to identify the non-skipped blocks. However, if the scheme does not have a co-located reference slice in the previous frame, the proxy server 110 directly encodes the blocks in the current slice as non-skipped blocks.

The slice-based screen encoding solves a continuous-memory constraint problem that typically occurs at the mobile device 102. For instance, the proxy server 110 no longer needs to allocate a large continuous frame buffer. Rather, the proxy server 110 only allocates some slice buffers that may be sent individually. Based on a small slice size, the allocation tends to be successful on the mobile device 102.

Furthermore, the slice-based screen encoding is more error-resilient than the frame-based encoding that typically occurs in error-prone wireless mobile networks. The proxy server 110 separately encodes slices in the same frame, packages the encoded slices, and sends the slices individually to the proxy-based browser 106 of the mobile device 102. Thus, the error in one slice will not propagate to the other slices. Thus, the proxy server 110 may retransmit and recover a slice where the error happened.

The proxy server 110 employs a progressive screen updating mechanism to improve page latency to the user 108. The proxy server 110 first updates a web screen inside a visible region on the proxy-based browser 106. The proxy server 110 progressively enlarges the coding region and updates the content to the proxy-based browser 106 on the mobile device 102. The proxy server 110 separates the web screen image into a series of images with gradually enlarged sizes starting from a visible size of the mobile device 102. The proxy server 110 encodes the images and updates the images individually to the proxy-based browser 106. This progressive screen updating mechanism supports variable-region screen encoding while using the slice-based coding architecture.

Provide a Web Page for a Proxy-Based Browser

Figure 8:
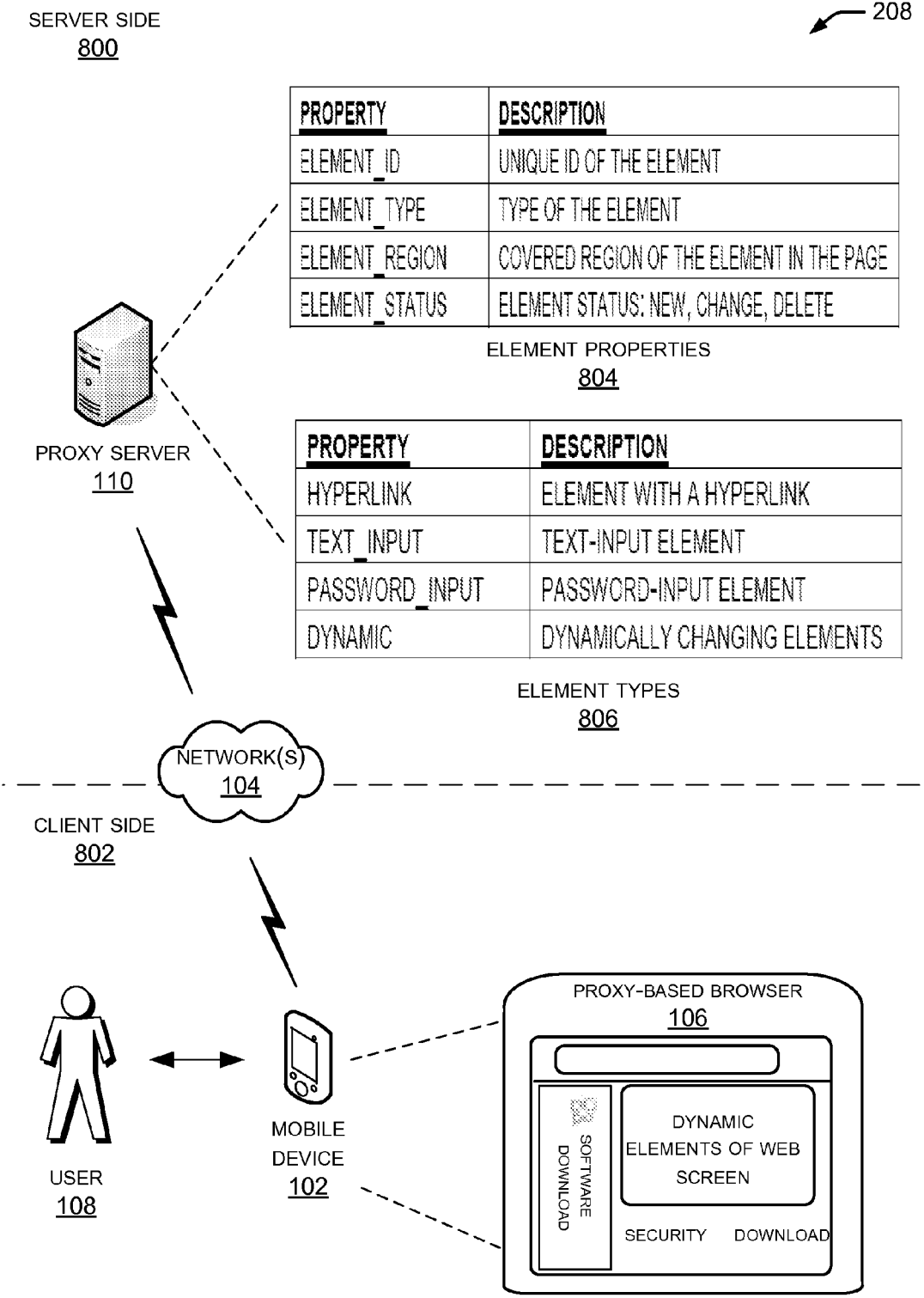
FIG. 8 illustrates an example process of providing an interactive experience with the proxy-based browser.

FIG. 8 illustrates an example process for phase 208 (discussed at a high level above) of providing a web page for a proxy-based browser based on the composite screen with user input.

The proxy server 110 located on a server side 800 sends web-element information to the proxy-based browser 106 on the mobile device 102 that is located on a client side 802. The proxy-based browser 106 may utilize the web-element information to execute some simple interaction logics to provide a quick response to the user 108. The proxy server 110 extracts the web elements from the virtual browser and updates the element properties 804 as needed to the mobile device 102. A table of element properties 804 includes property of element identity document (ID), element type, element region, and element status. On the right side of the table a description for each property identifies the element ID as a unique ID of the element, the element type as the type of the element, the element region as a covered region of the element in the web page, and the element status as a current status of new, change, or delete.

The proxy server 110 located on the server side 800 selectively updates the web elements to the proxy-based browser 106 located on the client side 802, according to the element types and the input received from the user 108. Thus, this selective update mechanism dramatically reduces undesired bandwidth consumption, which is especially beneficial for the mobile device 102. The web elements are classified into element types 806 that include but are not limited to Hyperlink, Text Input, Password Input, and Dynamic. The description is self-explanatory, such as Hyperlink refers to the element with a hyperlink, Text Input refers to the text-input element received from the user 108, Password Input refers to the password-input element received from the user 108, and Dynamic refers to dynamically changing elements. Based on the user 108 options for the element types 806, the selective update mechanism responds with interaction mechanisms.

Examples of input received from the user 108 along with selective updates are described below. The user 108 may provide input using at least one of a touch screen, a stylus on a touch screen, a mouse, or a keypad.

For instance, the user 108 clicks on a Hyperlink region, the proxy-based browser 106 draws a rectangle immediately around the Hyperlink region and sends a click event to the proxy server 110. This transmission informs the user 108 that the click is valid and is accepted by the proxy-based browser 106. Thus, the Hyperlink element avoids duplicate clickings in a high-latency network.

In another example, the user 108 enters text in Text Input, but needs to check immediately to determine if there is a typographical error. The proxy server 110 has a stringent low-latency requirement on the Text Input element. When the user 108 clicks on the Text Input element, the mobile device 102 locally holds the input text and renders the text to the Text Input region. After the user 108 finishes entering text, the mobile device 102 sends the text to the proxy server 110 and uses the remote rendered text to replace the local rendered.

In a similar example to Text Input, the user 108 enters text in Password Input, where stars, symbols, or the like are used to hide the inputting text. This process is similar to Text Input above except the input text is hidden.

In yet another example, the proxy server 110 applies Dynamic type to identify the dynamically changing web elements. For example, these web elements may include Adobe® Flash®, Microsoft® Silverlight™, Java™, and GIF 506. Web pages may have several Dynamic elements that update the display with high frame-rate animations. However, the user 108 may not desire all content with Dynamic elements to be updated. For instance, the user 108 would not be interested in updating the advertisements having the multimedia platform 504 content. Furthermore, updating the advertisements with the multimedia platform 504 content consumes too much bandwidth on the mobile device 102. Thus, a design mechanism selectively updates these element contents based on the user's options. The proxy-based browser 106 provides hints and options to the user 108 about the Dynamic element. For example, the hints and options provided to the user 108, may display "Click to enable" on the multimedia platform 504. If the user 108 clicks to enable the Dynamic element, then the proxy server 110 updates the element display for the Dynamic element to the proxy-based browser 106. However, if the user 108 does not provide input, the proxy server 110 maintains the element screen based on a first screen-shot. This selective update reduces bandwidth consumption.

Illustrative Server Implementation

Figure 9:
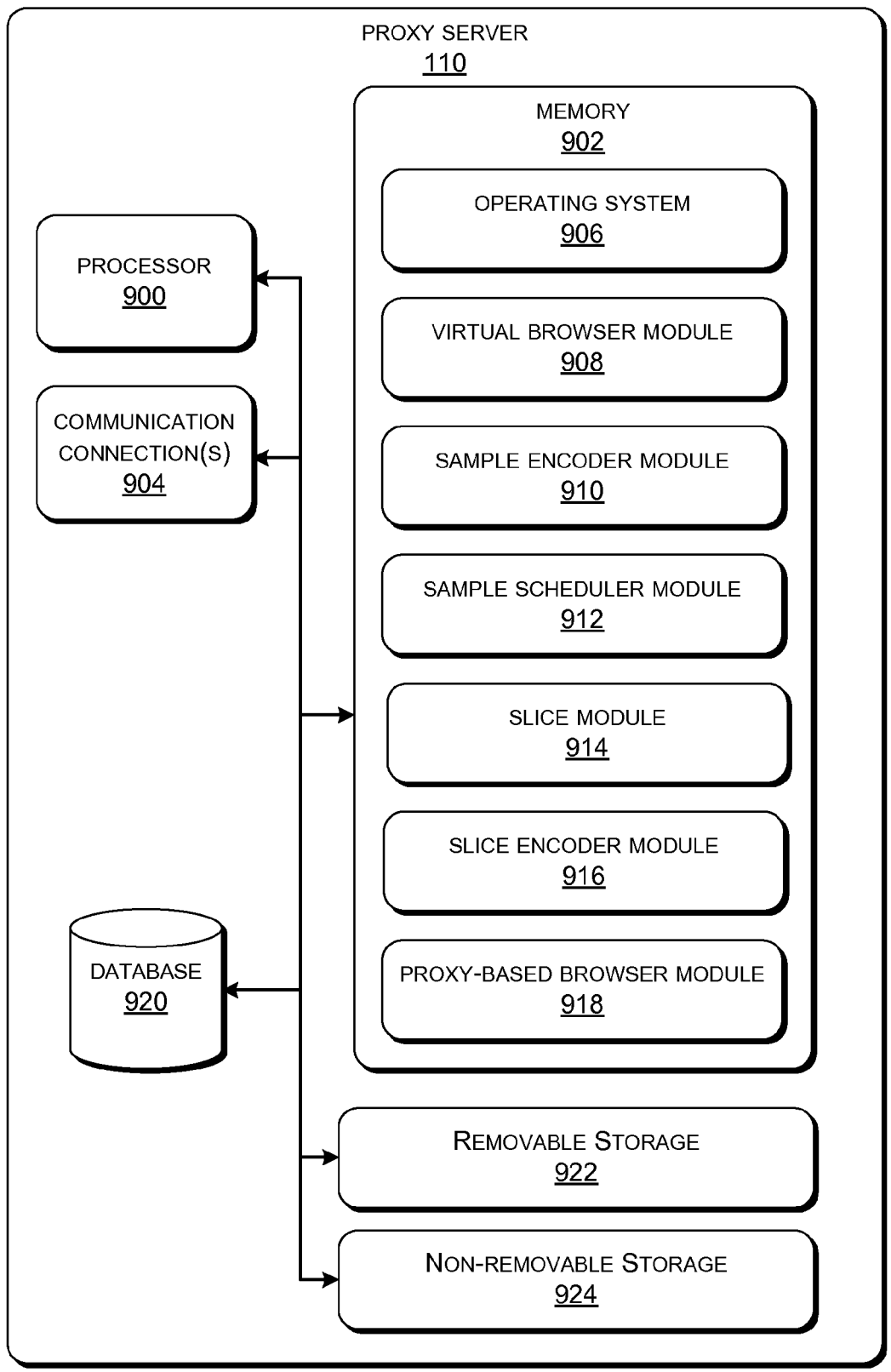
FIG. 9 illustrates example modules in the proxy server used to implement the proxy-based browser.

FIG. 9 is a block diagram showing an example proxy server 110 usable with the environment of FIG. 1. The proxy server 110 may be configured as any suitable system capable of services, which includes, but is not limited to, implementing the proxy-based browser 106 for online services, such as providing information resources from the web server 112 based on input from the user 108. In one example configuration, the proxy server 110 comprises at least one processor 900, a memory 902, and a communication connection(s) 904. The communication connection(s) 904 may include access to a wide area network (WAN) module, a local area network module (e.g., Wi-Fi), a personal area network module (e.g., Bluetooth), and/or any other suitable communication modules to allow the proxy server 110 to communicate over the network(s) 104.

Turning to the contents of the memory 902 in more detail, the memory 902 may store an operating system 906, a virtual browser module 908, a sample encoder module 910, and a sample scheduler module 912.

The virtual browser module 908 extracts and renders the web elements of the web pages. The virtual browser module 908 may interact with the proxy-based browser 106 directly. It provides the display and side information of the web elements for the web page to be displayed on the proxy-based browser 106, interacts with the other modules to reformat the web page for the proxy-based browser 106 while maximizing the element-level interactivity at a same time.

The sample encoder module 910 takes the rendered web elements and applies encoding mechanisms for the various element types.

The sample scheduler module 912 sends the encoded samples and the web-element side information to the mobile device 102 according to a network condition.

The memory 902 may also store a slice module 914, a slice encoder module 916, and a proxy-based browser 918. Furthermore, there may be one or more applications (not shown) for implementing all or a part of applications and/or services on the proxy server 110.

The slice module 914 performs the slice-based screen encoding procedures that were discussed with reference to FIG. 7. For instance, the slice module 914 splits the encoding frame into fixed-size slices, splits the previous screen frame into fixed-size slices and stores them, detects differences between a current slice and a co-located slice in the previous screen frame, identifies non-skipped blocks in the current slice to be fed into a slice encoder, and sends the encoded slices separately to the proxy-based browser 106. The slice module 914 also updates the raw slices in the current frame to a slice buffer.

The slice encoder module 916 encodes the non-skipped blocks in the current slice.

The proxy-based browser module 918 receives the samples and decodes the web elements. The proxy-based browser module 918 formats the composite screen and presents the display to the user 108. In another implementation, the mobile device 102 receives the samples and decodes the web elements.

The proxy server 110 may include a database 920 to store a collection of web pages previously retrieved, and the like. The proxy server 110 may also include additional removable storage 922 and/or non-removable storage 924. Any memory described herein may include volatile memory (such as RAM), nonvolatile memory, removable memory, and/or non-removable memory, implemented in any method or technology for storage of information, such as computer-readable storage media, computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The proxy server 110 as described above may be implemented in various types of systems or networks. For example, the proxy server 110 may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented at least partially by a processor, the method comprises:
   receiving a layout of a web page by a proxy server;
   extracting web elements from the web page and capturing images of the web elements of the web page;
   separating a subset of the web elements that are dynamic from background screen images of the web page by compressing the background screen images, wherein the compressing comprises performing a slice-based screen encoding to split a current frame into fixed-size slices and to split a previous screen frame into fixed-size slices;
   forming a composite screen format to represent a display of the web page, the composite screen format incorporating the subset of the web elements that are dynamic with the compressed background screen images of the web page;
   and
   providing the display of the web page synchronized with a mobile device based on the composite screen format and the compressed background screen images.

2. The method of claim 1, wherein the extracting the web elements further comprises:
   extracting the web elements that appear in a current visible region of the web page displayed on the mobile device; and
   identifying the web elements in the current visible region of the web page displayed on the mobile device based on at least by estimating a position of a web element based on a position of a parent element of the web element.

3. The method of claim 1, wherein the extracting the web elements further comprises extracting at least one of a hyperlink, a text input, a password input, a multimedia platform, or a graphics interchange format (GIF) from the web page.

4. The method of claim 1, wherein the capturing images of the web elements of the web page further comprises:
   capturing an image of a visible region of the web page as displayed; and
   capturing an image of the subset of the web elements that are dynamic in succession.

5. The method of claim 1, wherein the compressing each of the background screen images further comprises, for each background screen image:
   storing the fixed-size slices of the previous screen frame as a reference to a current frame;
   detecting a difference between a current slice and a co-located slice in the previous screen frame;
   identifying non-skipped blocks in the current slice to be fed into a slice encoder; and
   sending the encoded slices separately to the proxy-based browser.

6. The method of claim 1, further comprising receiving input from a user by:
   using at least one of a mouse, a touch screen, a stylus on a touch screen, or a keypad; and
   touching a hyperlink region, entering text, entering a password, or touching a dynamic web element that enables the dynamic web element to update.

7. The method of claim 1, further comprising encoding separately each of the fixed-size slices of the current frame and encoding separately each of the fixed-size slices of the previous screen frame.

8. The method of claim 1, further comprising:
   updating a web screen image located inside a visible region on the display of the web page;
   separating the web screen image into a series of web screen images with gradual enlarged sizes; and
   encoding and updating the series of web screen images individually.

9. The method of claim 1, further comprising:
   transmitting web element information to the proxy-based browser;
   receiving input from a user on the proxy-based browser;
   utilizing the web element information to provide an update to the proxy-based browser based at least in part on the input received from the user.

10. The method of claim 1, further comprising displaying the web page in a screen shot without updating the web page, unless a user provides input.

11. One or more computer-readable storage devices encoded with instructions that, when executed by a processor, perform acts comprising:

extracting web elements from a web page to provide a position and a size of the web elements;

capturing images of the web elements to provide a current appearance of the web elements in the web page;

separating dynamic web elements from a static background web screen image by compressing the static background web screen image free of the dynamic web elements; and incorporating the dynamic web elements with the compressed background screen images to provide a display of the web page on a proxy-based browser.

12. The computer-readable storage devices of claim 11, wherein the extracting the web elements comprises:

identifying the web elements in a current visible region of the web page based on at least by estimating a position of a web element based on a position of a parent element; and extracting at least one of a hyperlink, a text input, a password input, a multimedia platform, or a graphics interchange format (GIF) from the web page.

13. The computer-readable storage devices of claim 11, wherein the capturing images of the web elements comprise:

capturing an image of a visible region of the web page, the captured image is a region frame; and capturing images of the subset of the web elements that are dynamic in succession along a timeline, the captured images are element frames.

14. The computer-readable storage devices of claim 11, further comprising performing a slice-based screen encoding by:

splitting a current frame into fixed-size slices and splitting a previous screen frame into fixed-size slices;

storing the fixed-size slices of the previous screen frame as a reference to the current frame;

detecting a difference between a current slice and a co-located slice in the previous screen frame;

identifying non-skipped blocks in the current slice to be fed into a slice encoder; and sending the encoded slices separately to the proxy-based browser.

15. The computer-readable storage devices of claim 11, further comprising:

transmitting web-element information to the proxy-based browser;

receiving input from a user on the proxy-based browser;

utilizing the web-element information to provide an update to the proxy-based browser based at least in part on the input received from the user.

16. The computer-readable storage devices of claim 11, further comprising:

providing an update of the display based at least in part on receiving input from a user based on:

in an event that the input from the user is a click on a hyperlink region, drawing a polygon around the hyperlink region and relaying the click on the hyperlink region to the proxy server;

in an event that the input from the user is text input, holding the text input and rendering the text input to a Text Input region; and in an event that the input from the user is a click on dynamic elements, receiving updates of the dynamic elements to be displayed from a proxy server.

17. A proxy server comprising:

a memory;

a processor coupled to the memory;

a plurality of modules stored in the memory and executable on the processor, the plurality of modules comprising:

a virtual browser module configured to:

separate a subset of web elements of a web page that are dynamic from background screen images of the web page by compressing the background screen images of the web page; and form a composite screen format to represent a display of the web page, the composite screen format incorporating the subset of web elements that are dynamic with the compressed background screen images of the web page;

a proxy-based browser module configured to provide the display of the web page synchronized with a mobile device based on the composite screen format; and the virtual browser module further configured to receive user input for the web page being displayed and providing updates to at least one of the subset of the web elements that are dynamic based on the user input.

18. The proxy server of claim 17, the virtual browser module being further configured to:

extract the web elements from the web page by extracting the web elements that appear in a current visible region of the web page; and capture images from the web page by capturing a visible region of the web page as displayed, and by capturing images of the subset of the web elements that are dynamic.

19. The proxy server of claim 17, further comprising a slice module configured to, for each background screen image:

compress the background screen image of the composite screen format by splitting an encoded frame and splitting a previous screen frame into fixed-size slices;

detect a difference between a current slice and a co-located slice in the previous screen frame;

identify non-skipped blocks in the current slice to be fed into a slice encoder; and send the encoded slices separately to the proxy-based browser.

20. The proxy server of claim 17, the virtual browser module further configured to provide visual options to the user on enabling the subset of the web elements that are dynamic.

* * * * *